Patented Sept. 8, 1925.

1,552,907

UNITED STATES PATENT OFFICE.

THOMAS V. BINMORE, OF LONG ISLAND CITY, NEW YORK, ASSIGNOR TO THE NEW YORK BELTING & PACKING COMPANY, OF NEW YORK, N. Y., A CORPORATION OF NEW YORK.

PROCESS FOR FORMING AND APPLYING RUBBER DESIGNS AND PRODUCTS THEREOF.

No Drawing. Application filed January 7, 1925. Serial No. 1,017.

*To all whom it may concern:*

Be it known that I, THOMAS V. BINMORE, a subject of the King of Great Britain, residing at Long Island City, county of Queens, State of New York, have invented certain new and useful Improvements in a Process for Forming and Applying Rubber Designs and Products Thereof, of which the following is a full, clear, and exact description.

This invention relates to a process for forming and applying rubber designs, more particularly to a process for forming and applying such designs to rubber articles, and products obtained.

This application is a continuation in part of my application Serial No. 676,260, filed November 22, 1923.

Previously in forming and applying designs, such as ornamentation, trademarks, other emblems and size marks to rubber articles, a number of methods have been used, none of which is satisfactory. One of these methods is to print or stamp the design, such as a trademark or other marking, on the article by the use of ordinary printing or stamping devices with the inks commonly used with them. Another or transfer method is to form the desired design in mirror image on paper, cloth or other backing, apply this face down to the article and after vulcanization to remove the paper or other backing. Still another method is by embossing or imprinting on sheet rubber during the calendering process, or to emboss or imprint on molded articles during the molding operation, either by the use of an engraved mold or by a removable template inserted in the mold. Still another method is to form embossed rubber designs on a sheet which are cut out from the sheet and then affixed to the article by cementing.

All of these methods are open to more or less numerous objections. In the case of designs printed or stamped on a rubber article with the use of the ordinary inks the design is easily rubbed off or worn away, if affixed to a rubber article which is required to flex the design cannot flex with the article and cracks and becomes illegible, and in addition the ordinary inks used for this purpose frequently contain ingredients which have an injurious effect upon the rubber. The transfer method above referred to is also objectionable by reason of the fact that the design is easily rubbed or worn off, is not flexible, and requires the removal of the transfer backing after vulcanization. In the case of designs impressed on rubber during the calendering operation, such as emblems or trademarks applied to the shank portion of shoe sole stock, this method involves expensive engraving of the expensive calender rolls, and a separate engraved roll must be supplied for each design or emblem used, or as is common two such designs are engraved in alternation on the roll and in cutting soles from stock prepared on such a roll only the portions containing the design or emblem desired at the particular time are cut out and the rest of the stock becomes scrap. In the case of articles which are formed with a design during a molding operation, this result must be secured either by engraving the mold, which is an expensive process and limits the use of that particular mold to articles having only that one design thereon, or else as in the case of molded articles such as rubber hose a thin embossed metal template is placed in the mold. In this latter procedure a master die is used to form the templates and they are ordinarily used but once. When the molded hose is removed from the mold the template is embedded in it and labor is required to dig it out. This latter method also causes weakening of the wall of the hose and also causes projections on the inner wall which make its bore irregular, and in addition the outer covering of the hose is frequently torn in removing a template from the finished article, rendering the hose defective and causing rapid deterioration at this point. Another objection to embossed designs is that frequently it is desirable or necessary that the design be flush with the surface of the article, in which case the embossed designs cannot be used. Furthermore if an article is to be molded a previously embossed design cannot be used since this will become distorted or obliterated during the molding operation. Serious objections to all of the above outlined methods are that fine designs or marks cannot be clearly produced and in the case of embossed rubber designs the design and its background are of the same color and therefore the design cannot be distinguished except at a short distance, and the design itself of course cannot be in more than one color.

An object of my invention is to provide a method for forming designs on rubber or other articles which will not rub or scuff off, which will stretch or flex with the article when necessary, which will not weaken or injure the article, and which if necessary may be flush with the surface thereof.

Another object is to provide a process of making rubber designs, portions of which may be in different colors.

Still another object is to provide a process for making designs in rubber, such as ornamentation, labels, trademarks, etc., which is simple, relatively inexpensive, and does not require extensive equipment.

The invention consists broadly in forming a thin film of depolymerized rubber having depressed portions, adhesively uniting a backing to the relatively elevated portions of the film, separating such elevated portions from the remainder of the film by stripping away the backing, and vulcanizing. The invention also includes repeating the previously stated steps when desired on the same backing, using depolymerized rubber of different colors to thereby form a design in colors, and it also includes disposing depolymerized rubber on a rubber backing in the manner above set forth, vulcanizing, and then applying the vulcanized design thus produced to a rubber article and uniting them with or without vulcanization, the design being disposed either on the surface thereof or inset flush with the surface thereof as by molding. The invention also includes the products obtained by the process.

For a detailed disclosure of the nature and objects of the invention, reference is had to the accompanying specification and claims.

The invention will now be described as applied to the making of a design such as ornamentation, an emblem or other mark on a rubber or other backing and to the application of the article produced thereby to another rubber article when desired.

A raised die such as a zinc line-cut is first provided with a thin film of a depolymerized-rubber ink across its face, as by brushing. This ink may be formed from a suitable solution of depolymerized rubber mixed with any desired pigment, zinc oxide, sulphur, and a suitable vulcanizing ingredient or ingredients. This depolymerized rubber solution may be obtained by heating rubber for a considerable period of time in a high boiling solvent in the manner described in my copending application Serial No. 676,260 before mentioned. It may also be obtained by very thoroughly breaking down rubber and then dissolving it in a suitable solvent. Unvulcanized rubber treated by either of the above methods has its physical properties altered so that its elasticity and tensile strength are greatly reduced, and at ordinary temperature it resembles corresponding untreated rubber heated to a point where it begins to soften.

The term depolymerized rubber ink as used in the specification and claims is intended to cover an ink formed from rubber treated by either of the methods just described, or in any other suitable manner.

After inking the die the ink is allowed to dry for a short time, and as the solvent evaporates the film of ink recedes from the horizontal at those points in the die where it is unsupported and follows the profile of the recesses of the die. A backing is then lightly applied to the face of the die, which backing may be of any material the surface of which by its nature or by treatment is of such character that the portions of the ink film covering the raised parts of the die will stick to it. Upon then stripping the backing from the die the portions of the ink film on the raised part of the die adhere to the backing and break away from the portions of the ink in the recesses of the die in clear and sharp lines exactly as if the line cut or die had been used with printing ink on paper in a printing press. This result is due to the fact that the unvulcanized depolymerized rubber of the ink has had its elasticity and tensile strength so reduced as before stated that it breaks at the edges of the elevated portions instead of drawing away from the recessed portions. If the design is to be formed directly upon an article this article itself will provide the backing by which the raised portions of the depolymerized rubber ink are removed from the die, while if the design is to be in the form of a label or other mark to be attached to other articles, the backing will be in the form of a sheet, and in the case of labels which are to be attached to rubber articles this sheet will ordinarily be of unvulcanized or vulcanized rubber.

If the design is to be produced in different colors the operation is repeated, using a die having raised portions corresponding to the portions of the design which it is desired to print in a different color and the same backing is then placed upon the die and properly registered and then stripped as before. In this manner a design having two or more colors may be produced. When making small designs such as labels, emblems, trademarks, etc., a multiple die is preferably used, that is one containing a large number of the same designs. After stripping the backing from the die vulcanization is proceeded with, in the course of which the depolymerized rubber ink is vulcanized and if it has been applied to an unvulcanized rubber backing the latter is also vulcanized. When using a multiple die, after the backing sheet and the superposed depolymerized rubber have been subjected to the vulcanizing process, the individual designs are then cut apart for use. After taking an impression the die may be cleaned by pressing against it a mass of rubber with sufficient firmness to cause the rubber to sink into the die recesses, and upon removal of the rubber the unused portions of ink remaining on the die will be stripped off. In the case of designs such as trademarks, size marks, etc., which are to be used as labels, if formed on a backing other than rubber they are attached in any suitable manner, while if the backing is of rubber and the designs are to be attached to a rubber article they may be placed on the unvulcanized articles such as hose, belting, tires, shoes, tank balls, hot water bottles, etc., and the whole vulcanized in the usual manner. If vulcanization is accomplished without the use of a mold the design, such as a label, will appear on the surface of the article and slightly elevated depending upon its thickness. If on the other hand the article is cured in a mold the design will appear on the finished article as flush with the surface thereof, and due to the fact that the design and backing have been previously vulcanized they will sink without distortion into the article during vulcanization, displacing a small amount of the unvulcanized material which is in a plastic state due to the heat used in curing, so that even on a lightly friction coated belt the label sinks into a flush position without injury to the belt.

It will be seen that by the use of my process, numerous advantages are secured. In the first place very small and fine designs can be produced which are as clear as the finest printing on paper. Moreover the design can be produced in one color on a backing of another color, or the design itself can be produced in two or more colors. As a result of this the design is distinguishable at a much greater distance than in the case of an embossed design. Also by use of my process negative letters can be used, that is by the step known as reversing the die, in which portions of the die which would ordinarily be elevated are sunk or depressed and other portions which ordinarily form a background are elevated to take the ink. It will be seen that designs formed by my process will in no way injure the rubber or other article to which they are attached, and in the case where a design flush with the surface of a rubber article is desired, this can be readily accomplished without any distortion of the article or design or blurring of the outlines of the design. By the use of a multiple die the process is rendered inexpensive and its cost compares favorably with the work of a regular printing press.

When printing on a rubber or other flexible or elastic sheet, this sheet is first backed by paper or other material in known manner before applying to the die in order to prevent distortion during printing and to secure exact registration when printing in multiple colors. When the design, emblem or ornamentation has been printed on sheet material as just described and vulcanized when desired, it may be cut or died out through the paper or other backing and the paper removed when desired. Labels and other small designs are more conveniently handled for packing, etc., while thus backed by the relatively stiff paper.

The application of labels or other designs formed according to the invention is much simpler than in the case of the processes of the prior art, and no metal or paper has to be stripped from the face of the article after vulcanization. The designs will not rub or scuff off and may be flexed to the full breaking stretch of a rubber backing without injury.

The invention is capable of extensive use and may be applied in the manufacture of ornamental designs on rubber articles such as rubber doilies, aprons, bathing caps, and many other articles.

If designs in the form of rubber labels such as emblems, trademarks, size marks, etc. are produced by the invention, they are capable of extensive use with a very large number of rubber articles, such as tires, belting, hose, water bottles, footwear, etc., and as before stated they may be used with articles which are molded or unmolded to secure a label which is either slightly elevated above the surface of the article or is flush with its surface. Owing to the fineness of the lines which can be produced and the use of one or more colors the designs produced by the use of the invention are very handsome and attractive and help considerably in the sale of the article. At the same time as before stated the process can be carried out by the use of simple equipment and at relatively low cost.

While a specific example of the invention has been set forth, it is obvious that it is capable of considerable modification by those skilled in the art in view of the present disclosure, and the invention is not to be limited except as defined by the claims and their equivalents.

Having thus described my invention, what I claim and desire to protect by Letters Patent is:

1. A process for making designs in rubber which comprises forming a film of depolymerized-rubber ink with raised portions, directly applying a backing thereto, and removing said raised portions of the film by stripping the backing.

2. A process for making designs in rubber which comprises disposing depolymerized-rubber ink in a thin film, drying, and transfering a predetermined portion of said film to a backing to which it will adhere.

3. A process for making designs in rubber which comprises forming a dried film of depolymerized-rubber ink with a predetermined raised portion, transferring said raised portion to a backing to which it will adhere, and vulcanizing.

4. A process for making designs in rubber which comprises disposing a solution of depolymerized rubber in a partially unsupported thin film, changing the relative elevation of the supported and unsupported portions of the film by drying, adhesively uniting the elevated portions to backing material, removing said material and adhering portions of the film, and vulcanizing.

5. A process for making designs in rubber which comprises inking a die with a depolymerized-rubber ink, drying, and directly transferring a predetermined portion of the ink to a backing to form the desired design.

6. A process for making designs in rubber which comprises forming a film of depolymerized-rubber ink across the face of a raised die, drying the film whereby the film follows the profile of the die, transferring those portions of the film on the raised part of the die to a backing to which they will adhere, and vulcanizing.

7. A process for making designs in rubber which comprises inking a raised die with a depolymerized-rubber ink, drying, placing the die in contact with a sheet of rubber, stripping the sheet and adhering portions of dried ink from the die, and vulcanizing.

8. A process for making designs in rubber which comprises inking a multiple raised die with a depolymerized-rubber ink, drying, placing the die in contact with a sheet of rubber, stripping the sheet and adhering portions of dried ink from the die, vulcanizing and cutting out the individual designs from the sheet.

9. A process for making color designs in rubber which comprises successively superposing on a backing portions of depolymerized-rubber ink in different colors.

10. A process for making designs in rubber which comprises inking a raised die with a depolymerized rubber ink, drying, placing the die in contact with a backing sheet, stripping the sheet and adhering portions of dried ink, and superposing on the design thus formed portions of ink of another color by similar steps.

11. A process for superposing designs on vulcanizable articles which comprises applying to the article a thin vulcanized depolymerized-rubber-printed rubber design, and vulcanizing the article.

12. A process for superposing designs on vulcanizable articles which comprises applying to the article a thin vulcanized depolymerized-rubber-printed rubber design, and vulcanizing the article in a mold.

13. A process for making designs in rubber which comprises die printing on a backing with depolymerized-rubber ink.

14. A process for making designs in rubber which comprises die printing on a backing with depolymerized-rubber ink, and vulcanizing.

15. An article comprising a backing having depolymerized rubber disposed thereon in a predetermined arrangement and secured thereto by vulcanization.

16. An article comprising a backing having depolymerized rubber in different colors successively superposed thereon in predetermined arrangements and united by vulcanization.

17. A rubber article comprising a body of rubber having depolymerized rubber superposed thereon in a predetermined arrangement.

18. A rubber article comprising a body of rubber having depolymerized rubber superposed thereon in a predetermined arrangement and attached thereto by vulcanization.

19. A sheet rubber article die printed with depolymerized rubber ink and vulcanized.

20. A vulcanized rubber article having thereon a rubber design printed in different colors with depolymerized-rubber ink.

21. A rubber article having a previously vulcanized rubber design, printed in depolymerized rubber, attached thereto by vulcanization.

22. A vulcanized rubber article having a design formed of rubber and depolymerized rubber flush with the surface thereof and attached thereto by vulcanization.

23. A molded rubber article having a design formed of rubber and depolymerized rubber in more than one color flush with the surface thereof and attached thereto by vulcanization.

Signed at New York, county and State of New York, this 3rd day of January, 1925.

TOM V. BINMORE.